No. 704,261. Patented July 8, 1902.
B. H. LARKIN.
SHEET METAL BAILED CAN OR VESSEL.
(Application filed Oct. 22. 1900.)

(No Model.)

WITNESSES:
Lew. E. Curtis
H. W. Munday

INVENTOR:
Bernard H. Larkin.
By Munday, Evarts & Adcock
HIS ATTORNEYS.

UNITED STATES PATENT OFFICE.

BERNARD H. LARKIN, OF RIVER FORREST, ILLINOIS, ASSIGNOR, BY MESNE ASSIGNMENTS, TO AMERICAN CAN COMPANY, OF JERSEY CITY, NEW JERSEY, A CORPORATION OF NEW JERSEY.

SHEET-METAL BAILED CAN OR VESSEL.

SPECIFICATION forming part of Letters Patent No. 704,261, dated July 8, 1902.

Application filed October 22, 1900. Serial No. 33,924. (No model.)

*To all whom it may concern:*

Be it known that I, BERNARD H. LARKIN, a citizen of the United States, residing in River Forrest, in the county of Cook and State of Illinois, have invented a new and useful Improvement in Sheet-Metal Bailed Cans or Vessels, of which the following is a specification.

My invention relates to improvements in sheet-metal pails, cans, or vessels having bails.

Heretofore in sheet-metal cans or vessels having bails the bail-ears have usually been made in separate pieces from the head, ring, or breast of the can or vessel and secured in place by soldering, thus requiring considerable labor and expense in the manufacture.

The object of my invention is to provide a bailed can or vessel of a simpler, neater, better, and cheaper construction than those heretofore in use and by which the separate operations and labor of making the bail-ears, the material required for their manufacture, and the labor of soldering them in place may all be almost entirely saved.

My invention consists in the means I have devised for practically accomplishing this object or result—that is to say, it consists in providing the head, ring, or breast of the can with integral bail-ears cut and formed or stamped up at the same time and operation at which the head, ring, or breast itself is cut out or stamped up from the sheet, the integral bail-ears being cut and formed from the waste stock at the interspaces left in the metal sheet from which the heads, rings, or breasts are cut or stamped. The bail-ears being thus already attached to or integral with the head, ring, or breast of the can, the solder, labor, and expense of soldering it thereto or in place are entirely saved, as the same operation which solders the head, ring, or breast itself to the can-body secures the ears also thereto; and as the ears are cut and formed from the waste stock at the interspaces between the heads, rings, or breasts cut from the metal sheet the material to form the ears is also practically saved, and as they are cut out, formed, and stamped up at the same time or operation at which the heads, rings, or breasts themselves are cut out and stamped up the labor and expense of cutting and stamping them are also substantially saved.

Figure 1:
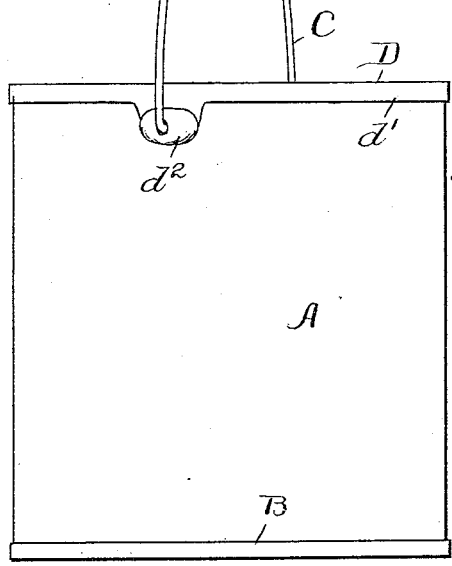
Figure 2:
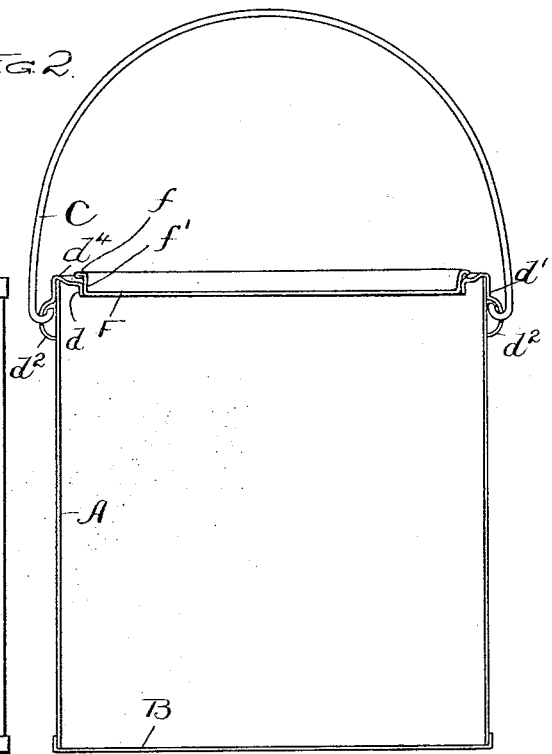
Figure 3:
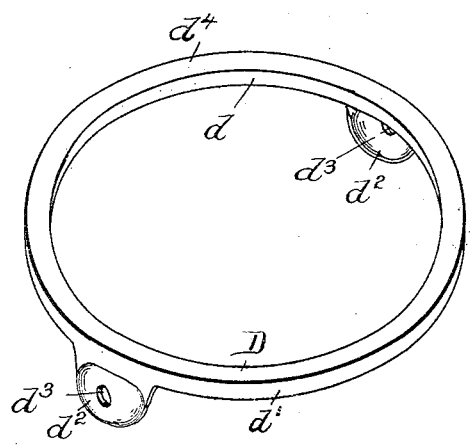
Figure 4:
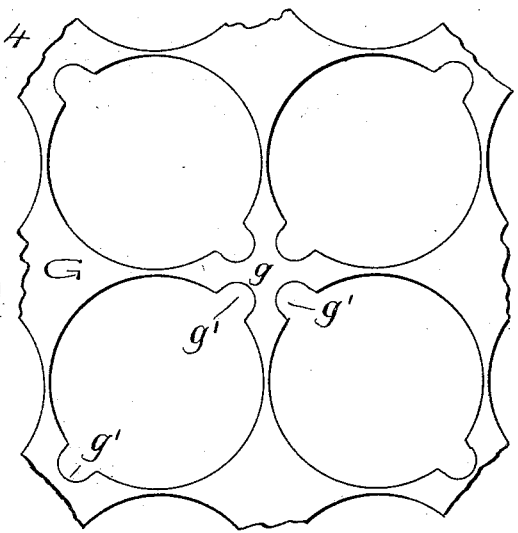

In the accompanying drawings, forming a part of this specification, Figure 1 is a side elevation of a friction-top can embodying my invention. Fig. 2 is a central vertical section. Fig. 3 is a detail perspective view of the ring or breast having the integral bail-ears; and Fig. 4 is a diagram view showing the blank or metal sheet from which the rings have been cut and illustrating the cutting of the integral ears from the otherwise waste stock at the corners or interspaces between the rings.

In the drawings, A represents the body of a sheet-metal can or other vessel; B, its bottom or lower head; C, its bail, and D its top head, ring, or breast, having the customary downturned interior depending flange $d$ at its inner edge to receive the friction top or cover F and form a liquid-tight joint therewith and provided with the downward exterior flange $d'$, soldered to the can-body. The exterior flange $d'$ of the head, ring, or breast D is provided at diametrically opposite points with integral bail-ears $d^2$, stamped up from suitable lips or extensions cut from the waste or interspace $g$ of the sheet G at $g'$ at the same time and operation that the head or ring D itself is cut and stamped up from the sheet. Each of the bail-ears $d^2$ is furnished with an eye $d^3$ to receive the hook of the bail. The integral bail-ears $d^2$ are of the usual dish shape and project downwardly at diametrically opposite points from the lower edge of the flange $d'$ of the head, ring, or breast D. The friction top or cover F is of the usual construction and has an exterior rim $f$ and depending flange $f'$ inside said rim fitting the flange $d$ of the breast D, the rim $f$ affording means for prying the tight-fitting friction-cover off over the corner $d^4$ of the ring or breast D as a fulcrum.

This improvement overcomes two great difficulties heretofore experienced—to wit, getting the ears improperly spaced, and, second, the ears breaking off after the cans have been filled with heavy material.

I claim—

1. The combination with a body A, of a head or breast D, provided with exterior flange $d'$, soldered to the can-body and having integral bail-ears $d^2$, projecting downwardly from the lower edge thereof and fitting and secured to the can-body, substantially as specified.

2. The head or breast D, for cans or vessels, provided with integral flange D', having integral dish-shaped bail-ears $d^2$ projecting downwardly from the lower edge thereof, in combination with a body A, to the exterior wall of which said integral bail-ears and said flange are soldered, substantially as specified.

3. The combination with a can body A of seamless ring or breast D having inner flange $d$ and exterior flange $d'$ provided with integral bail-ears $d^2$ projecting downwardly from the lower edge of said exterior flange $d'$, substantially as specified.

BERNARD H. LARKIN.

Witnesses:
EDMUND ADCOCK,
H. M. MUNDAY.